July 12, 1927.
E. G. KIMMICH
1,635,185
BELT JOINT
Filed Oct. 1, 1925
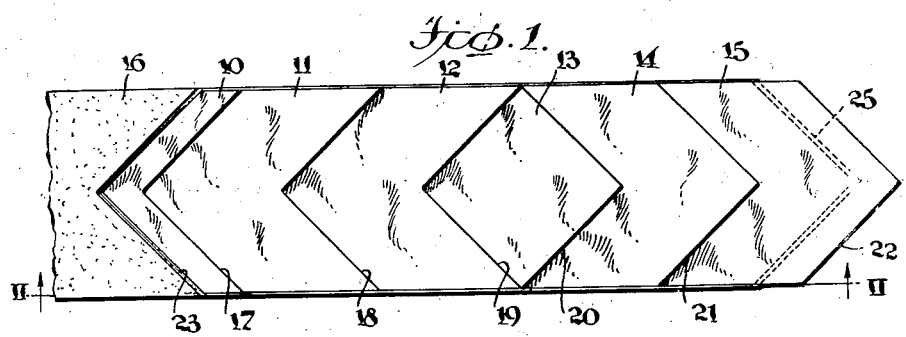
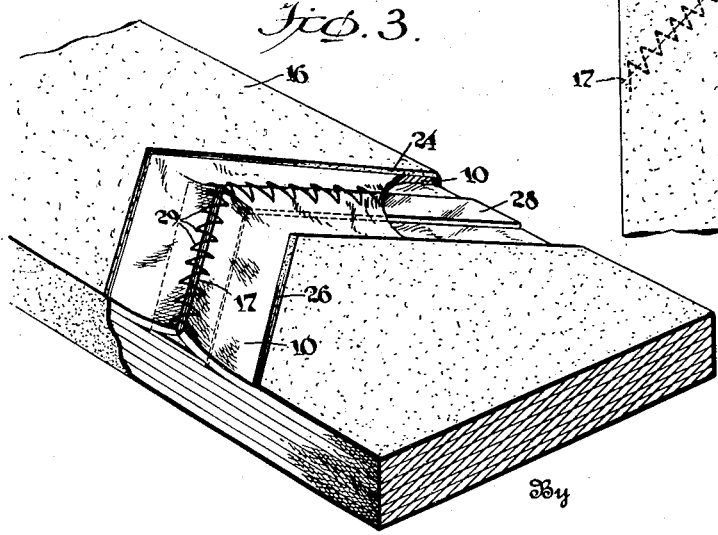
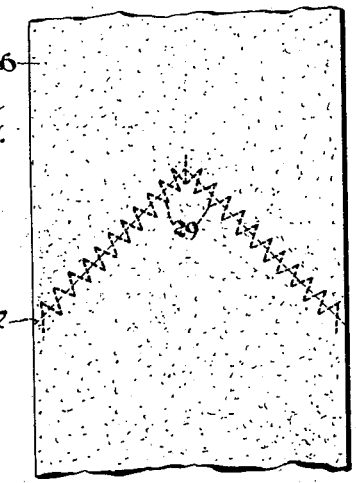
Inventor
Elmer G. Kimmich
By
Attorney Patented July 12, 1927.

1,635,185

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

BELT JOINT.

Application filed October 1, 1925. Serial No. 59,845.

My invention relates to belts, and it has particular reference to a means for joining the ends of laminated belts, or belts consisting of a number of layers or plies.

The common types of belt fasteners which are used with leather belts have not been particularly efficient in all cases when applied to laminated fabric belts, particularly in that type of belt wherein a plurality of layers of rubberized fabric are employed. Uneven joints, such as occur when the ends are lapped and riveted to each other, are unsatisfactory for certain installations such as conveyor belts, inasmuch as a smooth joint is preferred, and also because the rivets are apt to be worn away by pounding of the pulleys and from the abrasive action of material placed on the conveyor.

It is the object of the invention to provide a joint or splice for laminated belts, which shall be smooth, have a long life, and which may be readily made.

The nature of the invention may be understood from the following description of a method of forming the joint, reference being made to the accompanying drawings, wherein:

Fig. 1 is a plan view of an end of a belt, prepared for splicing;

Fig. 2 is a cross-sectional view taken substantially along the line II—II of Fig. 1;

Fig. 3 is a perspective view of a portion of the belt taken at the joint, portions being broken away; and Fig. 4 is a fragmentary plan view of the belt as it appears after the splice has been completed.

The belt shown in the drawings comprises a plurality of superposed layers or plies of rubberized cross-woven fabric, indicated by the numerals 10 to 15, inclusive, surrounded by a thin layer of rubber 16, the entire assembly being vulcanized. To form the joint, the layers of rubber and fabric are cut away successively at one end, thus exposing a portion of the face of each ply. Substantially one-half of the number of fabric layers are cut with V-shaped recesses, as indicated at 17, 18, and 19 respectively, in the plies 10, 11 and 12. The remaining plies of fabric, 13, 14, and 15, are cut at an angle, to provide V-shaped projections or tongues, 20, 21, and 22, of substantially the same shape and size as the recesses 17, 18, and 19. The layer of rubber 16 on the upper ply 10 is also cut at an angle to form a recess 23 similar to the recess 17 and is then beveled along the edge, as indicated at 24. The rubber coating on the underside of the belt is cut away from the fabric layer 15 along lines parallel to the tongue 22, and is beveled, as indicated at 25 and 26.

The opposite end of the belt is cut on a reverse pattern, the upper plies 10, 11, and 12, being provided with tongues equal in area to the recesses 17, 18, and 19, and the lower plies 13, 14, and 15, being provided with recesses equal in area to the tongues 20, 21, and 22. It is to be understood that the area of the exposed face of each layer is the same at both ends of the belt, in order to form continuous surfaces when the ends are superposed.

The recessed portion of the layer 10 is then lifted from the ply 11, as indicated at 27, and each end of the belt is coated with rubber cement. A V-shaped thin piece of tinfoil 28, or similar material, is placed under the lifted portion 27 of the ply 10, to prevent it from sticking to the ply 11, and also to hold it in proper position for sewing. The belt is then wrapped in a circular direction, to bring the ends into superposed relation, the tongue of each ply nesting into the recess formed in the opposite end, as indicated in Fig. 3. The meeting edges of the outer ply 10 are then interconnected by a suitable means, such as stitches 29. As the sewing operation progresses, the strip of tinfoil 28 is removed, and the ply 10 is pressed firmly against the ply 11. The space between the edges 24 and 26 of the rubber cover 16 is then filled with vulcanizable rubber, and the joint is vulcanized under pressure to form a continuous belt having a smooth unbroken surface, as indicated in Fig. 4.

It will be noted that provision is made for sewing one layer only, preferably that ply which is on the outside of the belt. It has been found that in a joint of this character, failure occurs, after prolonged use, usually by the separation of the outer ply, due to the repeated bending of the belt over the pulley. The ply is held in position by the stitches 29, and as long as this layer is prevented from loosening, the inner layers are likewise held in position. These other plies may be sewed, if desired, but when a good grade of cement is employed, only the outer layer need be secured.

From the foregoing description it is apparent that a rapid and efficient means for joining the ends of belts has been provided. It is to be understood that while a specific form of joint has been described, that the invention is not so limited. Thus, for example, each ply could be provided with a recess on one end and with a tongue on the other. The invention is applicable to laminated belts irrespective of the number of plies, and since it may be employed on belts other than those composed of rubberized fabric, only such limitations should be imposed as are set forth in the following claims.

What I claim is:

1. The method of joining laminated bands which comprises cutting the ends of the band to expose layers thereof, overlapping the ends and interconnecting one layer of each end only.

2. The method of joining laminated bands which comprises cutting the ends to expose the faces of each layer thereof, overlapping the ends and bringing the exposed surfaces of the respective layers into juxtaposition, and inter-connecting one layer of each band only.

3. The method of joining laminated belts which comprises cutting the ends of the belt to expose the faces of each layer thereof, superposing the ends to dispose the layers in nested relation, and interconnecting the outer layer of each end.

4. The method of joining laminated belts which comprises cutting the ends of the belt to expose the faces of each layer thereof, cutting the faces at an angle to the axis of and in the longitudinal plane of the belt, superposing the ends to dispose the layers in nested relation, and interconnecting the outer layer of each end.

5. The method of joining the ends of rubberized laminated fabric belts which comprises successively removing the portion of each layer to expose the face thereof, cutting recesses in some of the exposed layers and corresponding projections on others of the layers, superposing the ends to bring the recesses and projections of the meeting layers into juxtaposition, interconnecting the ends of the outside layer, coating the ends with vulcanizable rubber and vulcanizing the belt at the joint.

6. The method of joining the ends of rubberized laminated fabric belts which comprises successively removing from each end a portion of each layer to expose the face thereof, cutting V-shaped recesses in substantially half of the layers and corresponding V-shaped projections of the same area as the recesses on the remaining layers at each end, coating the ends with cement, superposing them to bring the recesses and projections of corresponding layers into juxtaposition, lifting the outside layer at each end and sewing the meeting edges together, pressing the sewed joint against the face of the adjacent layer, coating the joint with vulcanizable material and vulcanizing the joint.

7. In a laminated belt, a joint comprising interconnecting means extending between the ends of an outside layer only.

8. In a laminated belt, a joint comprising interconnecting means extending between the ends of one layer only.

9. In a laminated belt, a flush joint comprising a plurality of juxtaposed corresponding layers and interconnecting means extending between the ends of the outer layer only.

In witness whereof, I have hereunto signed my name.

ELMER G. KIMMICH.